United States Patent [19]

Takahashi

[11] Patent Number: 4,966,935

[45] Date of Patent: Oct. 30, 1990

[54] NON-FLAMMABLE POLYBUTYLENE THEREPHTHALATE COMPOSITION

[75] Inventor: Katsuhiko Takahashi, Fuji, Japan

[73] Assignee: Polyplastics Co., Ltd., Osaka, Japan

[21] Appl. No.: 364,514

[22] Filed: Jun. 9, 1989

Related U.S. Application Data

[63] Continuation of Ser. No. 106,967, Oct. 13, 1987, abandoned, which is a continuation of Ser. No. 774,259, Sep. 10, 1985, abandoned.

[30] Foreign Application Priority Data

Sep. 10, 1984 [JP] Japan .............................. 59-189249

[51] Int. Cl.$^5$ .............................................. C08K 3/22
[52] U.S. Cl. .................................... 524/412; 524/411; 524/605
[58] Field of Search ................ 524/410, 411, 412, 605

[56] References Cited

U.S. PATENT DOCUMENTS

| | | | |
|---|---|---|---|
| 3,560,441 | 2/1971 | Schwarcz et al. | 524/411 |
| 3,751,396 | 8/1973 | Gall | 524/371 |
| 3,855,277 | 12/1974 | Fox | 524/410 |
| 3,898,194 | 8/1975 | Sanroma | 524/411 |
| 4,044,073 | 8/1977 | Baron et al. | 524/412 |
| 4,257,937 | 3/1981 | Cohen et al. | 525/439 |

FOREIGN PATENT DOCUMENTS

| | | |
|---|---|---|
| 1494929 | 3/1969 | Fed. Rep. of Germany . |
| 2417663 | 10/1974 | Fed. Rep. of Germany . |
| 2512504 | 10/1976 | Fed. Rep. of Germany . |
| 1373774 | 11/1974 | United Kingdom . |
| 2108969 | 5/1983 | United Kingdom . |

OTHER PUBLICATIONS

Fillers for Plastics–pp. 8 and 9, (1971)–William Wake, editor, ILIFFE Books, London.
Patent Abstracts of Japan, vol. 8, No. 34, Feb. 15, 1984, Appln. No. 58-198543, (Kanegafuchi Kagaku Kogyo KK, 11/18/83).
Patent Abstracts of Japan, vol. 8, No. 212, Sep. 27, 1984, Appln. No. 57-205396, (Teijin KK, 6/2/84).

*Primary Examiner*—Veronica P. Hoke
*Attorney, Agent, or Firm*—Burns, Doane, Swecker & Mathis

[57] ABSTRACT

A polybutylene terephthalate composition comprises (A) polybutylene terephthalate, (B) a flame retardant and (C) a flame-retarding assistant of antimony trioxide having an average particle size of 1 micron or larger and eventually is improved in the flame-retarding property and stability when it melts.

7 Claims, No Drawings

NON-FLAMMABLE POLYBUTYLENE THEREPHTHALATE COMPOSITION

This application is a continuation of application Ser. No. 106,967, filed Oct. 13, 1987, now abandoned, which is a continuation of application Ser. No. 774,259, filed Sept. 10, 1985, now abandoned.

The present invention relates to a nonflammable polybutylene terephthalate compound having improved melt stability characteristics. More specifically, the invention relates to a flame-retarded polybutylene terephthalate compound having antimony trioxide used as a flame retarding assistant, wherein the compound has improved melt stability without detriment to its flame retardancy and other properties, and in particular to a polyblend compound of polybutylene terephthalate having polycarbonate and the like blended therein.

Prior Art

Thermoplastic polyalkylene terephthalate resins, as engineering plastics, are used in a wide range of applications because of their excellent mechanical and electrical properties and good molding characteristics. Above all, polybutylene terephthalate is widely used at present, since it is able to crystallize at a faster rate and does not particularly require any nucleating agent for accelerating its crystallization.

Because of the fact that polybutylene terephthalate is flammable, however, flame retardation thereof is strongly demanded where the material is used for electrical parts or the like. Therefore, in the production of a nonflammable polybutylene terephthalate, it is a general practice that a flame retardant and a flame retarding assistant are added to and blended with polybutylene terephthalate. Antimony trioxide is most commonly used as a flame retarding assistant. Where such flame retardant and such flame retarding assistant are so added and blended, it is conventionally required that, in order to prevent the additives from affecting the properties of a molded part, such as tensile strength, impact resistance, and the like mechanical strength, their particle size should be as small as possible so that their compatibility and dispersibility in the resin may be enhanced. For this reason, any antimony trioxide conventionally used as a flame retarding assistant is of such fine particle diameter as less than 1 $\mu$m, e.g. 0.5 $\mu$m.

Problem to be Solved by the Invention

However, any known nonflammable polybutylene terephthalate compound in which antimony trioxide is used as a flame retarding assistant has a difficulty that the greater its antimony trioxide content, the less satisfactory is its melt stability, which means reduced mechanical strength where a long-time detention in a molder is involved.

Where polybutylene terephthalate is used in those areas of application in which high mechanical strength and rigidity are required, it is used in the form of a compound containing a reinforcer such as glass fiber or the like. Generally, a polybutylene terephthalate compound containing a fibrous reinforcer such as glass fiber or the like is quite anisotropic and, therefore, it has a drawback that a molding of the compound is liable to deformation while in process of molding or when annealed. It is known to use polycarbonate in combination with polybutylene terephthalate in order to prevent such deformation. With such nonflammable polybutylene terephthalate compound having polycarbonate blended therein, however, it has been found that its melt stability is remarkably low due to the effect of the antimony trioxide used therein as a flame retarding assistant.

Solution to the Problem, and Effect Thereof

Various experiments were made by the present inventors in order to improve the melt stability of such nonflammable polybutylene terephthalate compound as aforementioned wherein antimony trioxide is used as a flame retarding assistant, and more particularly of such nonflammable polybutylene terephthalate compound less liable to deformation and having a reinforcer, such as glass fiber or the like, and polycarbonate blended therein. As a consequence, it was found that the use of antimony trioxide particles having a mean diameter of 1 $\mu$m or more, instead of such finer antimony trioxide particles having a mean diameter of less than 1 $\mu$m, e.g. 0.5 $\mu$m, as conventionally used, would result in remarkable improvement of the melt stability of a nonflammable polybutylene terephthalate compound of the aforesaid type without detriment to other properties thereof. This finding led to the present invention.

Accordingly, the invention provides a nonflammable polybutylene terephthalate compound having a flame retardant and a flame retarding assistant blended with polybutylene terephthalate, characterized in that an antimony trioxide having a mean particle diameter of 1 $\mu$m or more is used as a flame retarding assistant.

In the invention, the term "polybutylene terephthalate" means a polyester obtained by condensation of 1,4-butanediol and terephthalic acid, which may be a copolymer or mixture consisting principally of polybutylene terephthalate.

A flame retardant used for the purpose of the invention is any organic halogen compound or phosphorus compound generally used as such. More specifically, any aromatic bromine compound is preferred, which more concretely may be such low-molecular weight compound as bromine 5~10 substituted compound of diphenyl ether or bromine 5~10 substituted compound of aromatic ring of ethylene glycol diphenyl ether, or a bromide of a monomer or polymer of any aromatic carbonate or epoxy compound derived from bisphenol A or the like, or a bromide of any polystyrene oligomer, or a brominated cyanurate compound.

For the purpose of the present invention, one or more kinds of such flame retardants may be used for blending with other component materials.

The addition of a flame retardant is preferably limited to as small a quantity as possible, because an excessive addition thereof may have an unfavorable effect on the mechanical properties of the compound of the invention. The quantity of such addition is generally 1~30% by weight relative to the compound as a whole, and preferably 2~20% by weight.

Any antimony trioxide used for the purpose of the invention must have a mean particle diameter of 1 $\mu$m or more, and preferably of 2 $\mu$m or more. A mean particle diameter range of 5~7 $\mu$m is most preferred.

A system in which antimony trioxide and polycarbonate are present together is generally subject to noticeable deterioration through heating and melting. It is assumed that this may be attributable to the fact that catalytic effect of the antimony trioxide accelerates the decomposition of the polycarbonate and further causes ester exchange reactions thereof with the polybutylene terephthalate.

The present inventors assumed that these reactions should take place on solid surfaces of the antimony trioxide, and in order to reduce the surface area thereof, they considered the use of an antimony trioxide having a larger particle diameter. As a result, it was found that by using antimony trioxide particles having a mean diameter of 1 μm or more, in place of such finer antimony troxide particles having a mean diameter of less than 1 μm, e.g. 0.5 μm, as conventionally used, would it be possible to improve the melt stability significantly, or to a level where it may involve practically no problem, in a system in which polycarbonate is present in conjunction with the antimony trioxide. Furthermore, it was found that the use of an antimony trioxide having such large particle diameter caused practically no deterioration in the mechanical properties. In addition, it was found equal in flame retarding effect to the conventional type.

The quantity of antimony trioxide used in accordance with the invention, is 1~15% by weight relative to the compound as a whole, and preferably it is 2~10% by weight.

Polycarbonate as used for the purpose of the invention refers to a bisphenol-type polycarbonate, which may be obtained, for example, by causing bisphenol with carbonate or by causing phosgene to act on bisphenol in the presence of alkali. For the purpose of the invention, polycarbonate is preferably of highflow type wherever possible, and the addition thereof is 0.5~40% by weight relative to the polybutylene terephthalate. More particularly, an addition of 1~20% by weight is preferred. Any excessive addition thereof may have an unfavorable effect on the heat resistance of the compound.

According to the invention, by using an antimony trioxide having a large particle diameter as a flame retarding assistant in such nonflammable polybutylene compound having polycarbonate blended therein and less liable to deformation, it is possible to improve the melt stability of a system with which the polycarbonate is present, and to reduce possible deterioration of the resin compound due to the detention thereof in a molding machine.

Into the compound of the invention may be incorporated by blending one or more kinds of the following as reinforcing fillers: fibrous reinforcing fillers, including various inorganic fibers, such as glass fiber, carbon fiber, graphite fiber, metallic fiber, silicon carbide fiber, asbestos, wollastonite, and fibrous potassium titanate, whisker, and various organic fibers; and lamellar reinforcing fillers, such as micas (musovite, phlogopite, sericite, and the like), lamellar glass (glass flake), talc, and metallic foil.

These reinforcing fillers may be used according as required for various purposes, such as reinforcement of mechanical properties, provision of electrical conductivity, prevention of deformation, improvement of friction characteristics, and improvement of flame retardancy.

Especially for the purpose of preventing deformation through blending of a reinforcing filler, it is desirable to use a lamellar reinforcing filler, such as mica or glass flake.

A lamellar reinforcing filler will serve effectively to prevent deformation if it is added alone. Yet, in order to secure a high level of mechanical properties tensile strength and impact strength in particular, and to provide good dimensional accuracy, with less possibility of warping, it is more advantageous to use such filler in combination with a fibrous reinforcing filler. However, an excessive addition of reinforcing fillers may have an unfavorable effect on the moldability of the compound. From a practical point of view, therefore, the upper limit of such addition, as a total quantity of lamellar and fibrous reinforcing fillers, should be 60% by weight. More preferably, such limit is 20~50% by weight.

Among the various reinforcing fillers, specifically preferred are one or more kinds of reinforcing fillers selected from the group consisting of glass fiber, glass flake, and mica.

The compound according to the invention may contain a particulate additive to the extent that such content is not so detrimental to the moldability of the compound. The term "particulate additive" used herein means any of the following: glass bead, calcium carbonate, ground quartz, silica, magnesium carbonate, calcium sulfate, clay, diatomaceous earth, alumina, silica sand, glass power, metallic particle, and graphite. These particulate materials may be added for reducing the usage of lamellar reinforcing fillers, and also for providing any additional function.

The aforesaid reinforcing fillers and additives may be advantageously used after they are surface-treated with a suitable surface treating agent, whereby further improvement in mechanical properties can be effected. Various known surface treating agents may be used for the purpose of the present invention. Among such agents are, for example, silane-based, titanate-based, and epoxy-based ones.

In order to provide the compound of the invention with different characteristics according as required for each specific purpose, it is also possible to incorporate by addition into the compound one or more of the following: known additives such as lubricant, nucleating agent, release agent, antistatic agent, other surface-active agent, plasticizer, pigment, dye, heat stabilizer, and ultraviolet stabilizer; high-polymeric organic substances, such as vinyl compounds and their copolymers, including aforesaid polycarbonate, low-molecular weight polyethylene, polypropylene, polyethylene terephthalate, polyurethane, fluoroplastics, ethylene-vinyl acetate copolymer, ethylene-alkyl alkylate copolymer, styrene-butadiene-acrylonitrile copolymer, and styrene-acrylonitrile copolymer, polyphase graft copolymer consisting of polyacrylate, and thermoplastic segment-type copolyester.

The compound in accordance with the invention can easily be prepared by any known method generally employed in preparing a similar resin compound of the conventional type. Among the methods available for the purpose are, for example, one in which components, after blended, are incorporated and extruded by an extruder into pellets, which are then molded into shape, one such that pellets of different compositions are first prepared, which are then blended in the predetermined proportions, the blend being molded into a part having the desired composition, and one wherein one or more components are loaded directly into the molding machine.

Examples

To further illustrate the invention, the following examples are given. It is to be understood, however, that the scope of the invention is not limited by these examples.

Methods employed in measuring various properties referred to in the examples are as follows:

(1) Method of measurement for mean particle diameter of antimony trioxide

Measurement was made first of a specific surface area by gas permeability tests and adsorption method (BET method). From the specific surface area value was calculated a specific surface diameter, which was taken as a mean particle diameter.

blender, and then the blend was melted and kneaded by employing a 40 mm single-screw extruder, being thus made into a pellet-form compound. The pellet was molded into a test specimen by using an injection molder. The specimen was tested for measurement of its heat stability and mechanical properties.

For comparison purposes, a specimen using a conventional antimony trioxide with a mean particle diameter of 0.5 μm was prepared in similar manner, and tested for measurement. Test results are shown in Tables 1 and 2.

TABLE-1

| Component/Property | Method of measurement | Unit | Example 1 | Example 2 | Comp. Example 1 | Example 3 | Comp. Example 2 |
|---|---|---|---|---|---|---|---|
| Polybutylene terephthalate | | wt % | 46 | 46 | 46 | 46 | 46 |
| Polycarbonate | | " | 4 | 4 | 4 | 4 | 4 |
| Polycarbonate bromide (flame retardant) | | " | 10 | 10 | 10 | 10 | 10 |
| Antimony trioxide | | " | 4*3 | 4*1 | 4*2 | 4*1 | 4*2 |
| Particle diameter of antimony trioxide | | μm | 1 | 6 | 0.5 | 6 | 0.5 |
| Glass fiber | | wt % | 12 | 12 | 12 | 12 | 12 |
| Asbestos | | " | 4 | 4 | 4 | 4 | 4 |
| Glass flake | | " | 20 | 20 | 20 | — | — |
| Mica | | " | — | — | — | 20 | 20 |
| Tensile strength | ASTM D 638 | Kg/cm$^2$ | 1135 | 1105 | 1123 | 1052 | 1063 |
| Tensile elongation | " | % | 2.0 | 2.0 | 2.0 | 1.7 | 1.7 |
| Izod impact strength (notched) | ASTM D 256 | Kg · cm/cm | 4.6 | 4.4 | 4.9 | 4.2 | 4.3 |
| Hot stability | | | | | | | |
| Tensile strength (retention) | ASTM D 638 | Kg/cm$^2$, (%) | 908 (80) | 970 (88) | 784 (70) | 968 (92) | 765 (72) |
| Tensile elongation (retention) | " | %, (%) | 1.2 (60) | 1.3 (65) | 1.0 (50) | 1.2 (68) | 0.90 (53) |

*1 Produced by Nihon Mining & Concentrating Co.; trade name "PATOX L"
*2 Conventional
*3 Produced by Nihon Mining & Concentrating Co.; trade name "PATOX M"

TABLE-2

| Component/Property | Method of measurement | Unit | Example 4 | Comp. Example 3 | Example 5 | Comp. Example 4 |
|---|---|---|---|---|---|---|
| Polybutylene terephthalate | | wt % | 70 | 70 | 48 | 48 |
| Polycarbonate | | " | 4 | 4 | 4 | 4 |
| Polycarbonate bromide (flame retardant) | | " | 15 | 15 | 10 | 10 |
| Antimony trioxide | | " | 7*1 | 7*2 | 4*1 | 4*2 |
| Particle diameter of antimony trioxide | | μm | 6 | 0.5 | 6 | 0.5 |
| Glass fiber | | wt % | — | — | 30 | 30 |
| Asbestos | | " | 4 | 4 | 4 | 4 |
| Glass flake | | " | — | — | — | — |
| Mica | | " | — | — | — | — |
| Tensile strength | ASTM D 638 | Kg/cm$^2$ | 610 | 615 | 1340 | 1335 |
| Tensile elongation | " | % | 65 | 67 | 2.5 | 2.5 |
| Izod impact strength (notched) | ASTM D 256 | Kg · cm/cm | 3.1 | 3.0 | 7.5 | 7.5 |
| Hot stability | | | | | | |
| Tensile strength (retention) | ASTM D 638 | Kg/cm$^2$, (%) | 580 (95) | 418 (68) | 1206 (90) | 988 (74) |
| Tensile elongation (retention) | " | %, (%) | 42 (65) | 35 (52) | 1.6 (63) | 1.3 (52) |

*1 Produced by Nihon Mining & Concentrating Co.; trade name "PATOX-L"
*2 Conventional (2) Heat stability After detained in a molding machine (250° C.×30 min), pellets representing individual compounds were molded into tensile specimens by conventional procedure. The specimens were tested for measurement of their tensile elongation (ASTM D 638).

Examples 1~5, and Comparative Examples 1~4

Polybutylene terephthalate (produced by polyplastics Co.; trade name "Juranex 2002") was added with a fire retardant, an antimony trioxide having a mean particle diameter of 1 μm or 6 μm, polycarbonate, and various reinforcing fillers, as indicated in Tables 1 and 2. The components were blended by means of a ribbon The embodiments of the invention in which an exclusive property or privilege is claimed are defined as follows:

1. A polybutylene terephthalate composition which comprises (A) polybutylene terephthalate, (B) a flame retardant, (C) a flame-retarding assistant of antimony trioxide having an average particle size of 1–7 microns (D) polycarbonate, and (E) a reinforcing filler selected from the group consisting of glass flake, glass fiber and mica.

2. A polybutylene terephthalate composition as claimed in claim 1, in which (B) the flame retardant is an aromatic bromine compound.

3. A polybutylene terephthalate composition as claimed in claim 1, which comprises (B) 1 to 30 percent by weight, per polybutylene terephthalate, of the flame retardant and (C) 1 to 15 percent by weight, based on polybutylene terephthalate, of the antimony trioxide.

4. A polybutylene terephthalate composition as claimed in claim 1, in which (C) the antimony trioxide has an average particle size of 2 microns or larger.

5. A polybutylene terephthalate composition as claimed in claim 1, in which (C) the antimony trioxide has an average particle size of 5 to 7 microns.

6. A polybutylene terephthalate composition as claimed in claim 1, which further comprises (D) 0.5 to 40 percent by weight of polycarbonate.

7. A polybutylene terephthalate composition as claimed in claim 1, which further comprises (E) 1 to 60 percent by weight of a reinforcing filler selected from the group consisting of glass flake, glass fiber and mica.

* * * * *